United States Patent [19]

Harada et al.

[11] Patent Number: 4,553,199
[45] Date of Patent: Nov. 12, 1985

[54] HIGH FREQUENCY POWER SUPPLY DEVICE

[75] Inventors: Koosuke Harada, Fukuoka; Katsuaki Murata, Kumamoto, both of Japan

[73] Assignee: Tokyo Shibaura Denki Kabushiki Kaisha, Kawasaki, Japan

[21] Appl. No.: 541,653

[22] Filed: Oct. 13, 1983

[30] Foreign Application Priority Data

Apr. 13, 1983 [JP] Japan .................................. 58-67179

[51] Int. Cl.[4] ........................................... H02P 13/24
[52] U.S. Cl. ....................................... 363/75; 363/24; 363/82; 363/90
[58] Field of Search ................... 363/24–26, 363/47–48, 75, 82, 90–91, 133–134

[56] References Cited

U.S. PATENT DOCUMENTS

| | | | |
|---|---|---|---|
| 3,739,255 | 6/1973 | Leppert | 363/75 |
| 3,750,003 | 7/1973 | Peterson et al. | 363/56 |
| 4,356,438 | 10/1982 | Iwasaki | 363/91 X |
| 4,451,876 | 5/1984 | Ogata | 363/91 X |
| 4,468,723 | 8/1984 | Hughes | 363/90 X |

FOREIGN PATENT DOCUMENTS 0066007 5/1980 Japan .................................. 363/75

OTHER PUBLICATIONS

"Ferroresonant Converters with High-Frequency Drive" by Koosuke Harada and Katsuaki Murata, 14th Annual IEEE Power Electronics Specialists Conference Jun. 6–9, 1983, pp. 355–359.

Primary Examiner—Peter S. Wong
Attorney, Agent, or Firm—Cushman, Darby & Cushman

[57] ABSTRACT

A high frequency power supply device has an inverter circuit and an output circuit connected thereto. The inverter circuit includes a diode and a capacitor being connected in parallel to an output side of a switching transistor. A drive input voltage of the switching transistor has a dead time during which a collector voltage thereof is inverted by resonance between the capacitor and a circuit inductance of the device. The switching transistor is turned on when the diode is turned on, thereby reducing the switching loss of the switching transistor. The output circuit includes a ferroresonant circuit or a magnetic amplifier circuit which has a saturable inductor.

23 Claims, 19 Drawing Figures

HIGH FREQUENCY POWER SUPPLY DEVICE

BACKGROUND OF THE INVENTION

The present invention relates to a high frequency power supply device.

In order to obtain a small and lightweight high frequency power supply device having a ferroresonant circuit, a magnetic amplifier or the like as an output circuit; a high frequency AC power supply is required. In order to obtain a high frequency AC power supply from a DC power supply, a transistor inverter circuit is used. However, the switching loss of such an inverter circuit increases as the switching frequency rises. Such an increase in switching loss lowers the conversion efficiency of and increases heat generation in the transistor. This prevents production of a compact high frequency power supply device.

Regarding the output circuit, a ferroresonant circuit is less frequently prone to erratic operation due to noise such as electric/magnetic external noise, and has an innate protection function against overloading. However, a ferroresonant circuit operable under commercial frequencies is too heavy and large in size to be adopted as a power supply for recent electronic equipment. In addition to this, the iron loss increases in proportion to the switching frequency.

In a conventional power supply device, since the switching loss and the iron loss increase in proportion to the switching frequency, the conversion efficiency falls and heat generation from the switching element increases at higher frequencies. The need for dissipation of generated heat limits the degree to which the power supply device can be made compact in size.

In order to solve this problem and render the overall device small and lightweight, an inverter circuit which suffers only a small switching loss is required. An improvement in the output circuit such as a ferroresonant circuit, a magnetic amplifier or the like must also be made.

SUMMARY OF THE INVENTION

It is accordingly the primary object of the present invention to provide a high frequency power supply device having an improved conversion efficiency.

Another object of the present invention is to provide a high frequency power supply device which can be compact in size and can be lightweight.

In accordance with an aspect of the present invention, there is provided a high frequency power supply device having an inverter circuit and an output circuit connected thereto. The inverter circuit includes a diode and a capacitor being connected in parallel to an output side of a switching transistor. A drive input voltage of the switching transistor has a dead time during which a collector voltage thereof is inverted by resonance between the capacitor and a circuit inductance of the device. The switching transistor is turned on when the diode is turned on, thereby reducing the switching loss of the switching transistor. The output circuit comprises a ferroresonant circuit or a magnetic amplifier circuit which has a saturable inductor.

DETAILED DESCRIPTION OF THE PREFERRED EMBODIMENTS

Figure 1:
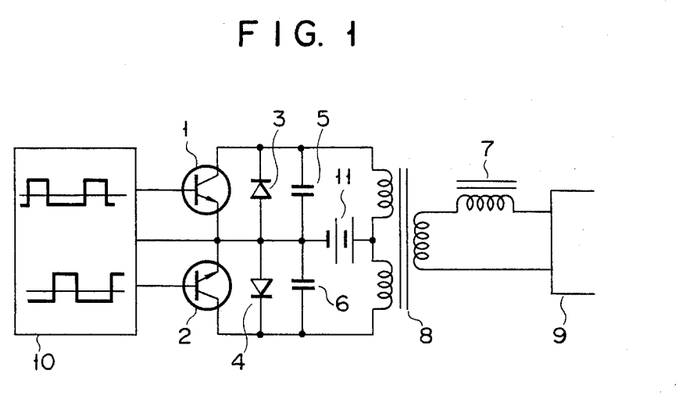
FIG. 1 is a circuit diagram of an inverter circuit to be used in a high frequency power supply circuit of the present invention.
Figure 2A:
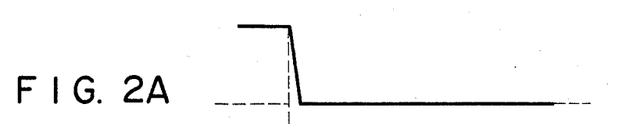
FIGS. 2A to 2D show the voltage and current waveforms for explaining the principle of operation of the circuit shown in FIG. 1.
Figure 2B:
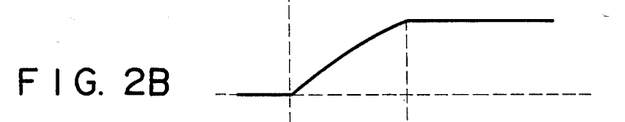
Figure 2C:
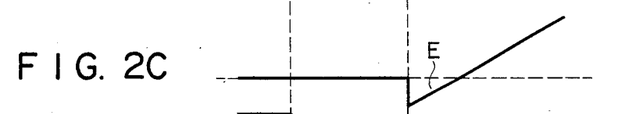
Figure 2D:
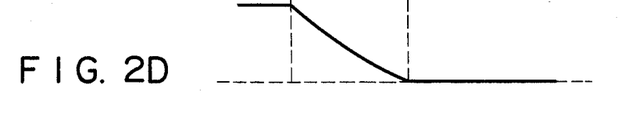

FIG. 1 shows an example of an inverter circuit used in a high frequency power supply device of the present invention. A capacitor 5 and a diode 3 are connected in parallel to the collector and emitter of a switching transistor 1. Similarly, a capacitor 6 and a diode 4 are connected in parallel to a switching transistor 2. An inductor 7 is an inductance component of a load or an inductance component attached to the inverter circuit. Switching operations from the ON state to OFF state of switching transistor 1 and from the OFF state to ON state of switching transistor 2 will be described with reference to the voltage and current waveforms in FIG. 2, at the respective parts of the circuit shown in FIG. 1. Since the drive input voltages applied to switching transistors 1 and 2 have dead times as described before, transistor 2 is turned on a period of time after transistor 1 is turned off. When the current flowing in transistor 1 abruptly decreases to zero and transistor 1 is turned off as shown in FIG. 2A, the collector voltage of transistor 1 is gradually increased at an angular frequency $\omega$ by the resonance of inductor 7 and capacitors 5 and 6, as shown in FIG. 2B. The angular frequency $\omega$ is given by $\sqrt{\frac{1}{2}LC}$ where L is the inductance of inductor 7 and C is the capacitance of capacitors 5 and 6. The collector of transistor 2 is coupled to the collector of transistor 1 through a coupling transformer 8 in FIG. 1. The collector voltage of transistor 2 has a phase opposite to that of the collector voltage of transistor 1 as shown in FIGS. 2B and 2D. When the collector voltage of transistor 2 starts to fall below 0 V, diode 4 connected in parallel to transistor 2 is turned on and the voltage is kept at about 0 V (FIG. 2D). At this time, the collector voltage of transistor 1 which has the opposite phase to that of the collector voltage of transistor 2 stops increasing (FIG. 2B). When a drive input voltage from a drive signal generator 10 (FIG. 1) is supplied to transistor 2 during the ON time of the diode 4 (portion E in FIG. 2C), one switching operation is completed.

In this manner, when transistor 1 is switched from the ON state to the OFF state, its collector voltage gradually increases from 0 V as shown in FIG. 2B. Accordingly, the wave-overlapping of, and hence the product of, the collector current and the collector voltage is little, so that the average of the product (collector loss) over time is extremely small. Since transistor 2 is turned on when its collector voltage is 0 V as shown in FIG. 2D, no loss appears. For this reason, the switching loss of the inverter transistor is very small, and therefore, the switching frequency can be increased. Accordingly, a compact lightweight inverter circuit can be obtained. In the case of high frequency operation, only a junction capacitance of the transistor may be used for the capacitors 5 and 6.

When the inverter circuit as described above is combined with an output circuit with a control function, a high frequency power supply device according to the present invention can be obtained. The output circuit is preferably a ferroresonant circuit or a magnetic amplifier circuit which has a saturable inductor (reactor) or an equivalent circuit.

[Embodiment 1]

Figure 3:
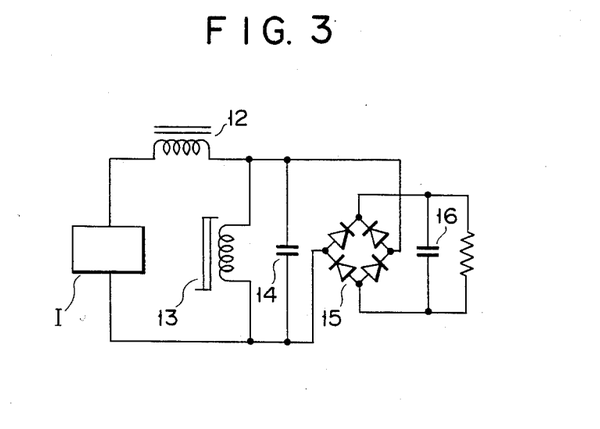
FIGS. 3 to 7 are circuit diagrams showing different combinations of an inverter circuit and a ferroresonant circuit.

FIG. 3 shows an embodiment wherein an inverter circuit and a ferroresonant circuit are combined. This embodiment is a case of a DC-DC converter wherein a ferroresonant circuit consisting of a linear inductor 12 which is equivalent to a linear inductor 7 in FIG. 1, a saturable inductor 13, and a capacitor 14 is coupled to an inverter circuit I so as to stabilize the circuit I and an output voltage therefrom. In this embodiment, linear inductor 12, saturable inductor 13, and capacitor 14 constitute the ferroresonant circuit. A voltage across both terminals of capacitor 14 is kept substantially constant.

The output from the ferroresonant circuit is rectified by a bridged rectifier 15, is smoothed by a filter capacitor 16 and is supplied to a load (resistor in FIG. 3).

While rectifier 15 is ON, capacitors 14 and 16 are connected in parallel to each other. Since capacitor 16 has a sufficiently small impedance at the switching frequency, the voltage across the terminals of capacitor 14 is substantially constant. When saturable inductor 13 is saturated, the saturated inductor 13 and capacitor 14 cause resonance, and the voltage across the terminals of capacitor 14 is phase-inverted. However, since the voltage on capacitor 14 is lower than that on capacitor 16, the bridged rectifier 15 is kept OFF. The time taken for inverting the voltage across the terminals of capacitor 14 is determined by the saturation inductance of saturable inductor 13 and the capacitance of capacitor 14. Since the inverting time is sufficiently small in contrast to the switching period, the voltage across the terminals of capacitor 14 can be considered to be a squarewave voltage.

In the device of the above embodiment, a low loss inverter circuit and a core material with a small iron loss are used. Accordingly, the device can operate in the high frequency range.

[Embodiment 2]

Figure 4:
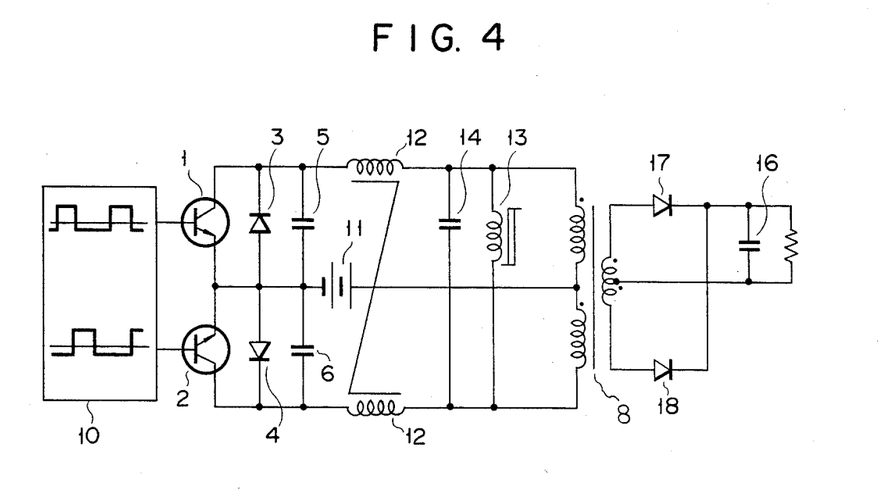

FIG. 4 shows another embodiment of the present invention. In this embodiment, a ferroresonant circuit is assembled into an inverter circuit. The mode of operation of the overall device is similar to that of the device of the first embodiment. The same reference numerals as used in FIGS. 1 and 3 denote the same parts in FIG. 4. The second embodiment differs from the first embodiment in that an output voltage level is freely adjustable, and that the rectifier in the output circuit comprises two elements, i.e., diodes 17 and 18 (this feature is practically advantageous).

Figure 5:
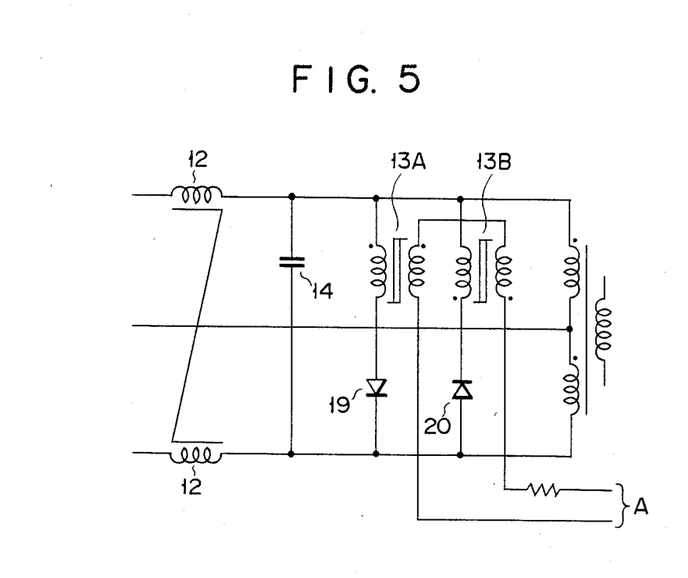

The ferroresonant circuit shown in FIG. 4 may have a configuration as shown in FIG. 5. Referring to FIG. 5, the amplitude of the flux of saturable inductors 13A and 13B are controlled by a feedback signal A from the output of the circuit. In this case, fine output voltage adjustment can be performed.

[Embodiment 3]

Figure 6:
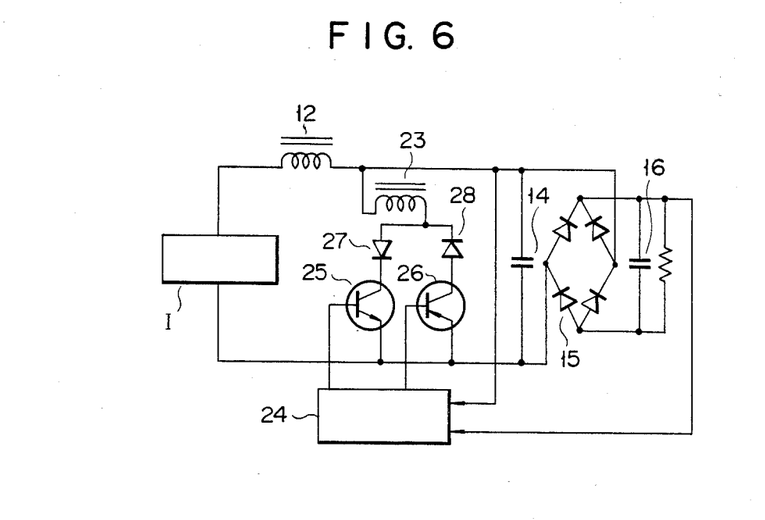

FIG. 6 shows still another embodiment of the present invention. The circuit of this embodiment is particularly suitable for high frequency operation. When a ferroresonant circuit operates within a high frequency range and the magnetic saturation degree of the ferroresonant circuit core becomes large, the iron loss increases in proportion to the switching frequency and the conversion efficiency deteriorates. In view of this problem, in the third embodiment, a linear inductor 23, a phase shifter 24, transistors 25 and 26, and diodes 27 and 28 are used in place of the saturable inductor of the ferroresonant circuit. Thus, the adjustment of output voltage is performed without use of a saturation of magnetic core.

The phase shifter 24 obtains a voltage having delayed phase on the basis of a voltage across the terminals of capacitor 14 and a feedback from the DC output of the device, and drives the transistors 25 and 26 with this obtained voltage. Transistors 25 and 26 are turned on when the current flowing through linear inductor 23 is 0 A. Thus, transistors 25 and 26 are easily saturated (i.e., the collector-emitter voltage is nearly 0 V) and, therefore, the switching loss at this time is small. Thereafter, a resonant current due to linear inductor 23 and capacitor 14 flows through transistors 25 and 26. Then, transistors 25 and 26 remain ON and the resonant current becomes 0 A again. Since transistors 25 and 26 are then turned off, there is no switching loss during this switching period.

Figure 7:
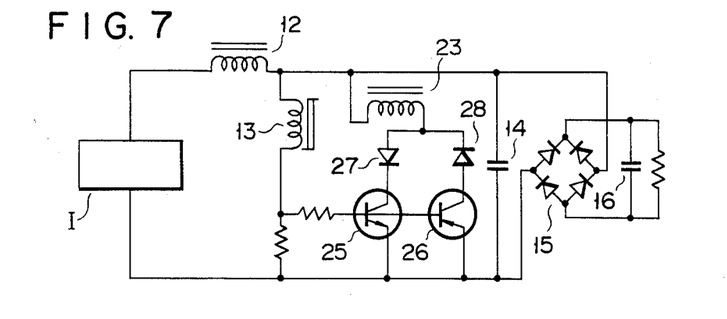

FIG. 7 shows an embodiment wherein the saturable inductor 13 is used as a phase shifter. In this embodiment, the saturable inductor is used only for providing a reference voltage. The base of transistors 25 and 26 is driven by this reference voltage, thereby obtaining a substantial constant output voltage. Since saturable inductor 13 need only supply the base currents to transistors 25 and 26, saturable inductor 13 may comprise a small magnetic core.

Figure 8A:
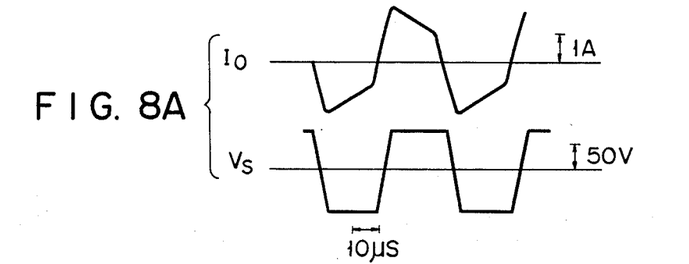
FIGS. 8A, 8B and 8C show the voltage and current waveforms in the circuit shown in FIG. 7.
Figure 8B:
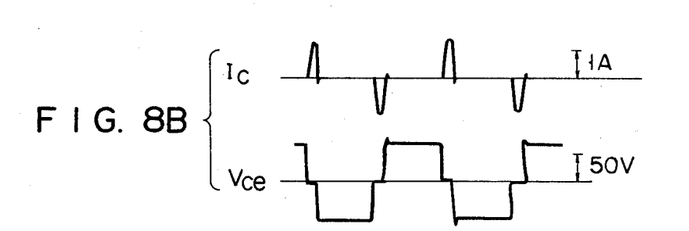
Figure 8C:
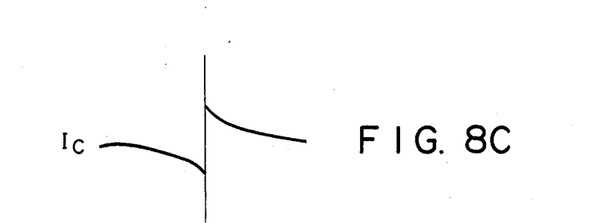

FIGS. 8A to 8C show the voltage and current waveforms at the respective parts of the circuit of FIG. 7. FIG. 8A shows a current supplied from the inverter circuit to the ferroresonant circuit through inductor 12, and also shows a voltage Vs obtained across the terminals of capacitor 14. The voltage Vs is rectified and the rectified voltage is supplied as a DC output voltage. FIG. 8B shows a current Ic, the positive portion of which flows through linear inductor 23, diode 27 and transistor 25, and the negative portion of which flows through transistor 26, diode 28 and linear inductor 23. A voltage Vce shown in FIG. 8B is a DC voltage across the two terminals of the series circuit of transistor 25 and diode 27 and across the two terminals of the series circuit of transistor 26 and diode 28. The positive portion of voltage Vce is applied to transistor 25 through diode 27, and the negative portion thereof is applied to transistor 26 through diode 28. FIG. 8C shows the switching locus of Ic - Vce. FIG. 8C indicates that the switching is nearly a so-called "E class" switching.

Figure 9A:
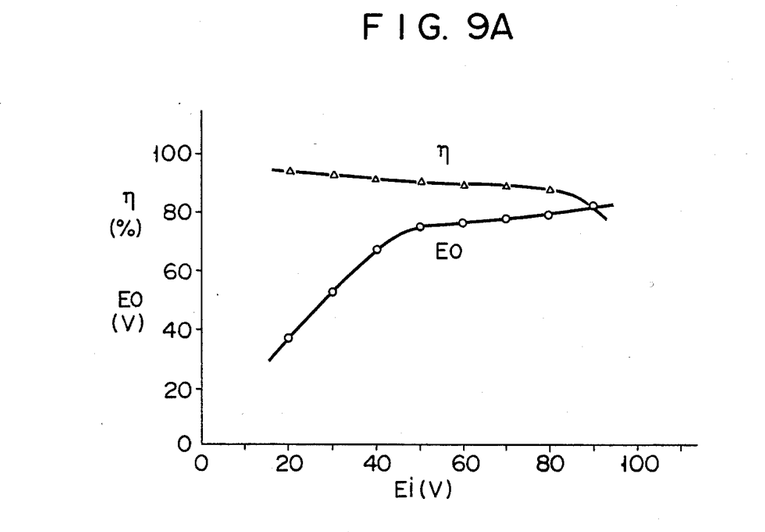
FIGS. 9A and 9B show a conversion efficiency and an output voltage as a function of an input voltage and an output current, respectively.
Figure 9B:
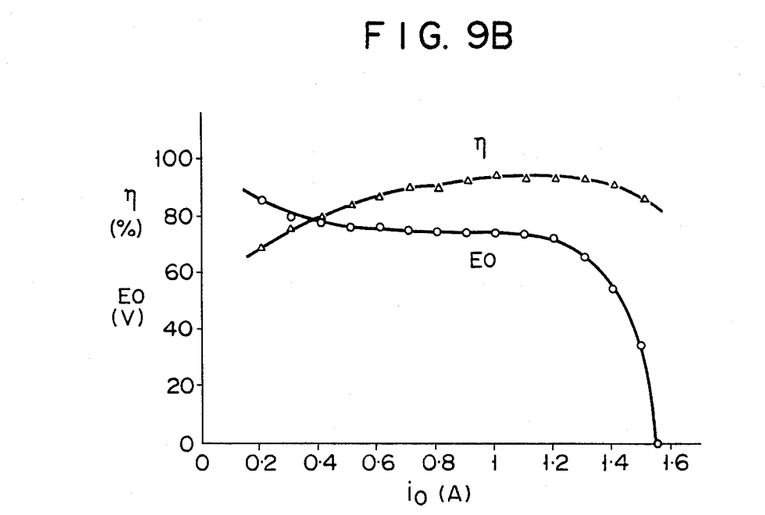

FIGS. 9A and 9B show the results when the switching frequency is set to be 20 kHz in this embodiment. FIG. 9A is a graph showing an output voltage Eo and an efficiency η as a function of an input voltage Ei. FIG. 9B is a similar graph showing an output voltage Eo and an efficiency η as a function of an output current Io. As may be seen from these graphs, the efficiency is 80% or higher in this embodiment.

[Embodiment 4]

Figure 10:
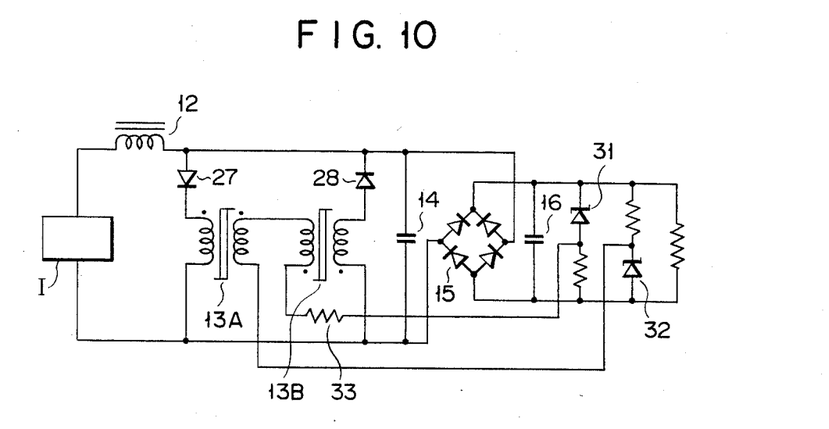
FIG. 10 is a circuit diagram of a high frequency power supply circuit comprising a different combination of an inverter circuit and a ferroresonant circuit.

FIG. 10 shows still another embodiment of the present invention. The circuit of this embodiment can operate with a low loss within a still higher frequency range. This embodiment has a feature wherein two saturable inductors having a feedback circuit from the output circuit are used, and a linear inductor and a capacitor are combined.

In this case, the operation of saturable inductors 13A and 13B is the same as that of a self-saturating magnetic amplifier. These inductors 13A and 13B operate with a minor hysteresis loop; they have a low loss during operation in a high frequency range. Since inductors 13A and 13B have control windings, feedback from the DC output voltage is easily applied. The feedback is effected through constant voltage (Zener) diodes 31 and 32 and a resistor 33. A good voltage-stabilizing characteristic can be obtained by adjusting the amplitude of the flux through the operation of such a feedback.

Figure 11A:
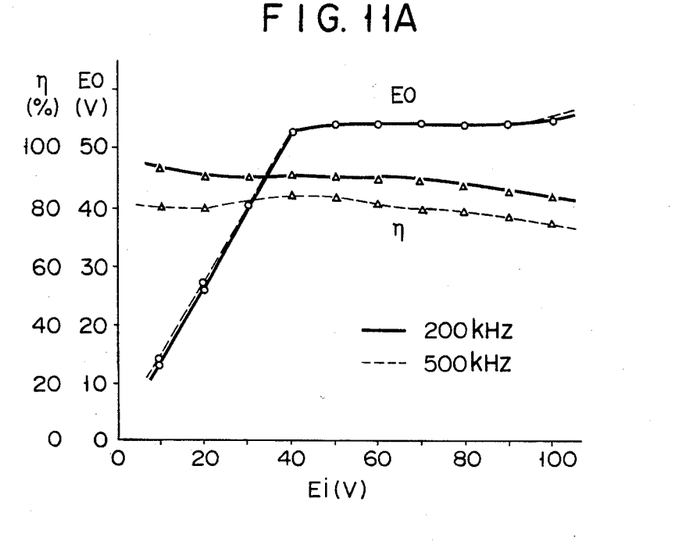
FIGS. 11A and 11B show a conversion efficiency and an output voltage as a function of an input voltage and an output current, respectively.
Figure 11B:
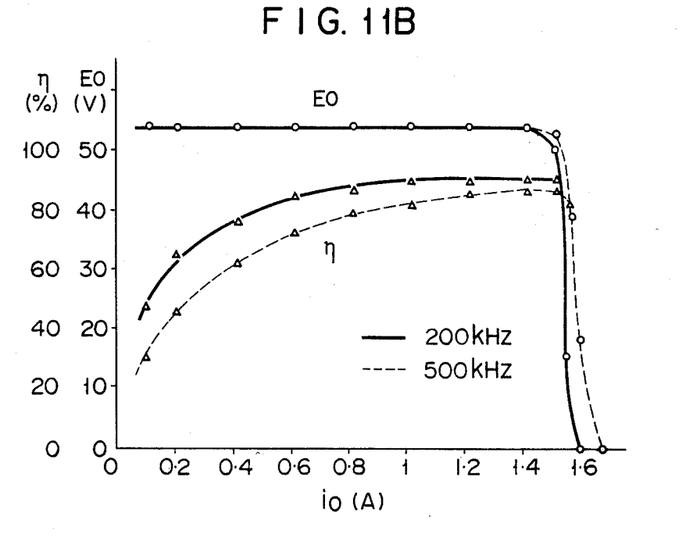

FIGS. 11A and 11B show the results obtained when the switching frequency is set to be 200 kHz and 500 kHz in this embodiment. FIG. 11A is a graph showing an output voltage Eo and an efficiency η as a function of an input voltage Ei. FIG. 11B is a graph similarly showing an output voltage Eo and an efficiency η as a function of an output current Io. As may be seen from these graphs, excellent output voltage characteristics and a high efficiency can be obtained at a switching frequency of 500 kHz.

[Embodiment 5]

Figure 12:
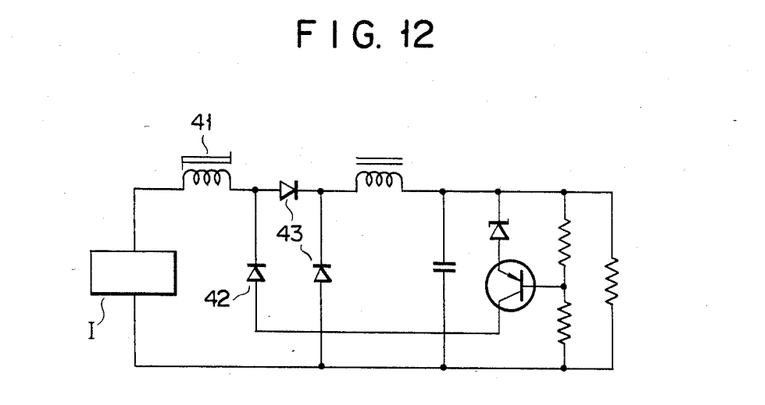
FIG. 12 is a circuit diagram of a high frequency power supply circuit comprising a combination of an inverter circuit and a magnetic amplifier circuit.

FIG. 12 shows still another embodiment of the present invention wherein the output circuit is a magnetic amplifier circuit having a saturable inductor. The magnetic amplifier circuit of this embodiment is a half-wave magnetic amplifier comprising a saturable inductor 41 for voltage control. The reset amount of saturable inductor 41 is controlled through a feedback diode 42, thereby adjusting an output voltage. In FIG. 12, reference numeral 43 denotes two rectifying diodes.

Although a half-wave magnetic amplifier is shown in the embodiment, the magnetic amplifier may be a full-wave magnetic amplifier so as to reduce the adverse influence of deviated magnetization of the inverter transformer.

The magnetic material to be used for the saturable inductor in the device of the present invention preferably has a high square ratio of hysteresis, a low coercive force and low eddy current loss. Typical examples for the material are Permalloy, amorphous alloy, etc., and an amorphous magnetic alloy is particularly preferable. A particularly preferred example of the amorphous magnetic alloy is represented by the formula $Co_aM_bZ_c$ for $55 \leq a \leq 90$, $0 \leq b \leq 30$, $10 \leq c \leq 45$ (atm %), and $a+b+c=100$ (atm %), where M is at least one element selected from the group consisting of Ti, V, Cr, Mn, Fe, Ni, Zr, Nb, Mo, Hf, Ta, W, Ir, platinum group metals, and rare earth elements; and Z is at least one element selected from the group consisting of Si, B, C, P, Al, and Ge. For a high square ratio and a low coercive force, a selected element preferably has a composition which results in a magnetostriction of $5 \times 10^{-6}$ or less. For this purpose, Fe, Mn and Ni are particularly preferable as M. In order to improve thermal stability of magnetic characteristics, V, Cr, Nb, Mo, Ta, and W are effective and may be used either singly or as an admixture or compound of more than one thereof. Z is an element for rendering the material amorphous and preferably comprises a combination of Si and B in consideration of the thermal stability of magnetic characteristics. In the ranges wherein a is 55 atm % or more and c is not more than 45 atm % and wherein a is not more than 90 atm % and c is 10 atm % or more, an amorphous state may be easily obtained by the conventional rapid liquid cooling method. When b is 30 atm % or less, the saturation magnetic flux density can be made high. Preferably, the conditions $58 \leq a \leq 80$, $2 \leq b \leq 25$ and $15 \leq c \leq 35$ are met.

A preferred example of such a composition is, for example, $(Co_{0.88}Fe_{0.06}Ni_{0.04}Nb_{0.02})_{75}Si_{15}B_{10}$. The magnetic material for the linear inductor and the inverter transformer may be ferrite or dust core. An amorphous magnetic alloy is preferably used as the magnetic material. An amorphous material to be used for the linear inductor or the like has a formula $Fe_dX_eZ_f$ for $70 \leq d \leq 85$, $0 \leq e \leq 10$, $15 \leq f \leq 30$ (atm %), and $d+e+f=100$ (atm %), where X is at least one element selected from the group consisting of Ti, V, Cr, Mn, Co, Ni, Zr, Nb, Mo, Hf, Ta, W, rare earth elements, and platinum group metal metals; and Z is at least one element selected from the group consisting of Si, B, P, C, Ge and Al. Fe is an element necessary for realizing a high saturation magnetic flux density which is a characteristic required for a linear inductor. X serves to improve soft magnetic properties and allows a low loss and a low magnetostriction. Cr, Ni, Co, Nb, Mo and W are particularly preferable as X. Z is an element necessary for rendering the material amorphous. In consideration of thermal stability, Z preferably comprises a combination of Si and B. When d is 70 atm % or more and f is less than 30 atm %, the saturation magnetic flux density can be made high and the iron loss becomes low. When e is 10 atm % or less, the saturation magnetic flux density can be kept high. Preferably, the conditions $75 \leq d \leq 82$, $0 \leq e \leq 7$, and $18 \leq f \leq 25$ are met. When a particularly high saturation magnetic flux density is required, e of the element x may be 0 atm %.

A preferred example of the composition has a formula $Fe_{79}Si_5B_{16}$ or $Fe_{79}Nb_4Si_5B_{12}$.

Finally, there is a publication pertinent to the present invention, which has been published by the inventors of the present application:

Koosuke Harada and Katsuaki Murata, "FERRORESONANT CONVERTERS WITH HIGH-FREQUENCY DRIVE", 14th Annual IEEE Power Electronics Specialist Conference, Session 6-4

All disclosures of the above publication are combined herewith.

While the invention has been described in connection with what is presently considered to be the most practical and preferred embodiment, it is understood that the invention is not to be limited to the disclosed embodiment but, on the contrary, is intended to cover various modifications and equivalent arrangements included within the spirit and scope of the appended claims which scope is to be accorded the broadest interpretation so as to encompass all such modifications and equivalent structures.

What is claimed is:

1. A ferroresonant converter comprising:

signal generator means for generating first and second drive signals;

first switch means, having a first circuit path, for on/off switching said first circuit path in accordance with said first drive signal;

a first diode connected in parallel to said first circuit path;

second switch means, having a second circuit path, for on/off switching said second circuit path in accordance with said second drive signal, said second circuit path being connected in series to said first circuit path to form a first series circuit;

a second diode connected in parallel to said second circuit path;

inductor means, connected to said first series circuit and having a given inductance, for generating said AC output in accordance with the on/off switching of said first and second switch means; and capacitor means having a given capacitance and being coupled with said inductor means, for forming a resonance circuit with said inductor means, wherein said first and second drive signals are so controlled that one of said first and second circuit paths is switched-on after a period of dead time from when the other thereof is switched-off, said period of dead time being sufficient to allow the phase of said AC output to become inverted by said resonance circuit.

2. A converter according to claim 1, wherein said inductor means includes a ferroresonant circuit.

3. A converter according to claim 2, wherein said ferroresonant circuit includes:

a saturable inductor connected in parallel to said first series circuit;

a capacitor connected in parallel to said saturable inductor; and a linear inductor connected between said saturable inductor and said first series circuit.

4. A converter according to claim 3, wherein said saturable inductor includes an amorphous magnetic alloy core.

5. A device according to claim 4, wherein said amorphous magnetic alloy has a formula:

$Co_aM_bZ_c$ for $55 \leq a \leq 90$, $0 \leq b \leq 30$, $10 \leq c \leq 45$, and $a+b+c=100$ (atm %), where M is at least one element selected from the group consisting of titanium, vanadium, chromium, manganese, iron, nickel, zirconium, niobium, molybdenum, hafnium, tantalum, tungsten, iridium, platinum group metals, and rare earth elements; and Z is at least one element selected from the group consisting of silicon, boron, carbon, phosphorus, aluminum and germanium.

6. A converter according to claim 3, wherein said linear inductor includes an amorphous magnetic alloy core.

7. A device according to claim 6, wherein said amorphous magnetic alloy has a formula:

$Fe_dX_eZ_f$ for $70 \leq d \leq 85$, $0 \leq e \leq 10$, $15 \leq f \leq 30$, and $d+e+f=100$ (atm %), where X is at least one element selected from the group consisting of titanium, vanadium, chromium, manganese, cobalt, nickel, zirconium, niobium, molybdenum, hafnium, tantalum, tungsten, platinum group metals, and rare earth elements; and Z is at least one element selected from the group consisting of silicon, boron, phosphorus, carbon, germanium, and aluminum.

8. A converter according to claim 2, wherein said ferroresonant circuit includes:

signal source means for generating a third drive signal in response to said AC output;

switch circuit means connected to said signal source means and connected in parallel to said first series circuit, for regulating the value of said AC output applied to said signal source means; and a linear inductor connected between said switch circuit means and said first series circuit.

9. A converter according to claim 8, wherein said signal source means includes:

a saturable inductor connected in parallel to said first series circuit, for regulating said AC output value; and means connected to said saturable inductor, for providing said third drive signal in response to a current flowing through said saturable inductor.

10. A converter according to claim 9, wherein said saturable inductor includes an amorphous magnetic alloy core.

11. A converter according to claim 8, wherein said linear inductor includes an amorphous magnetic alloy core.

12. A converter according to claim 2, wherein said ferroresonant circuit includes:

a first saturable inductor connected in parallel to said first series circuit and having a flux;

a first diode connected in series to said first saturable inductor to form a second series circuit;

a second saturable inductor connected in parallel to said second series circuit and having a flux;

a second diode connected in series to said second saturable inductor;

a linear inductor connected between said first series circuit and said second series circuit; and means connected to said first and second saturable inductors and being responsive to said AC output, for changing the flux developed in each of said first and second saturable inductors in accordance with the value of said AC output.

13. A converter according to claim 12, wherein each of said saturable inductors includes an amorphous magnetic alloy core.

14. A converter according to claim 12, wherein said linear inductor includes an amorphous magnetic alloy core.

15. A converter according to claim 2, wherein said inductor means further includes an inverter transformer having a primary winding connected to said first series circuit and a secondary winding for providing said AC output, and wherein said ferroresonant circuit includes:

a saturable inductor connected in parallel to said primary winding;

a capacitor connected in parallel to said saturable inductor; and a linear inductor connected between said saturable inductor and said first series circuit.

16. A converter according to claim 15, wherein said saturable inductor includes an amorphous magnetic alloy core.

17. A converter according to claim 15, wherein said linear inductor includes an amorphous magnetic alloy core.

18. A converter according to claim 2, wherein said inductor means further includes an inverter transformer having a primary winding connected to said first series circuit and a secondary winding for providing said AC output, and wherein said ferroresonant circuit includes:
a first saturable inductor connected in parallel to said primary winding and having a flux;
a first diode connected in series to said first saturable inductor;
a second saturable inductor connected in parallel to said primary winding and having a flux;
a second diode connected in series to said second saturable inductor;
a linear inductor connected between said primary winding and said first series circuit; and
means connected to said first and second saturable inductors and being responsive to said AC output, for changing the flux developed in each of said first and second saturable inductors in accordance with the value of said AC output.

19. A converter according to claim 18, wherein each of said saturable inductors includes an amorphous magnetic alloy core.

20. A converter according to claim 1, further including:
a magnetic amplifier connected to said inductor means; and
a saturable inductor connected between said magnetic amplifier and said inductor means.

21. A converter according to claim 20, wherein said magnetic amplifier includes a half-wave rectifier circuit.

22. A converter according to claim 20, wherein said saturable inductor includes an amorphous magnetic alloy core.

23. A converter according to claim 20, wherein said linear inductor includes an amorphous magnetic alloy core.

* * * * *

UNITED STATES PATENT AND TRADEMARK OFFICE
CERTIFICATE OF CORRECTION

PATENT NO. : 4,553,199
DATED : November 12, 1985
INVENTOR(S) : Koosuke Harada, et al It is certified that error appears in the above-identified patent and that said Letters Patent is hereby corrected as shown below:

On the title page assignee should read

-- (73) Assignee: Harada Koosuke, Fukuoka-Ken, Murata Katsuaki Kumamoto-Ken, Tokyo Shibaura Denki Kabushiki Kaisha, Kawasaki-Shi, Japan --.

Signed and Sealed this

Tenth Day of June 1986

[SEAL]

Attest:

DONALD J. QUIGG

Attesting Officer

Commissioner of Patents and Trademarks